Aug. 18, 1942.  W. C. FRANCIS  2,293,603

ROLLER BIT

Filed March 3, 1941

W. C. Francis.
INVENTOR.

BY J. Vincent Martin
and
Ralph R. Browning.
ATTORNEYS

Patented Aug. 18, 1942

2,293,603

UNITED STATES PATENT OFFICE 2,293,603

ROLLER BIT

Walter C. Francis, Houston, Tex., assignor to Reed Roller Bit Company, Houston, Tex., a corporation of Texas Application March 3, 1941, Serial No. 381,525

2 Claims. (Cl. 255—71)

This invention relates to a drilling bit and has for its general object the provision of an improved cutter bearing for a roller cutter type of bit.

More specifically, this invention has for its object the provision of a bearing for a roller cutter, which bearing will be both sturdy and easily assembled.

Another object of this invention is to provide a bearing for the side cutter of a roller bit, in which all of the load upon the cutter will be transmitted directly to the bit head, in which the number of component parts of the bearing will be reduced to a minimum, and in which the structure will be capable of assembly with the least possible time and labor.

Other objects and advantages of this invention will become apparent from the following description taken in connection with the accompanying drawing wherein is set forth by way of example one embodiment of the invention.

Figure 1:
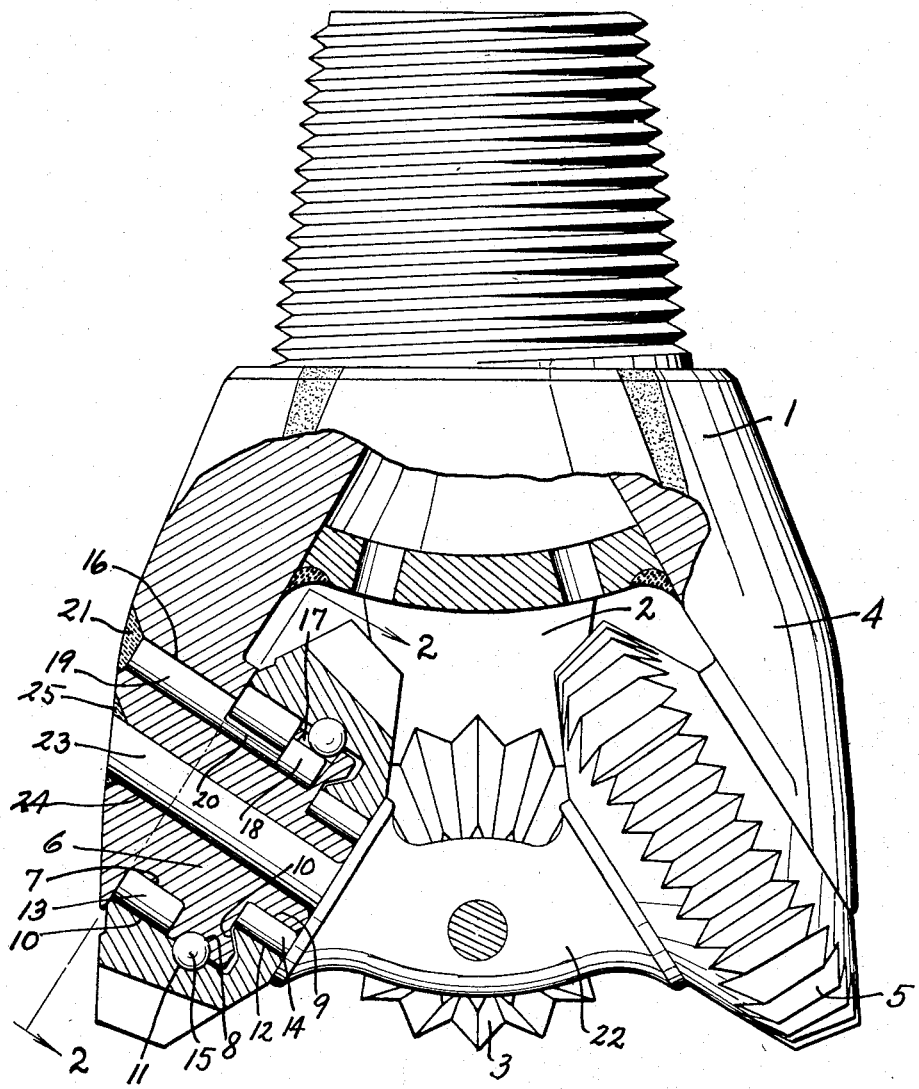
Fig. 1 is a view showing a side elevation of a bit constructed in accordance with this invention, a portion thereof being broken away and shown in vertical cross section for the purpose of illustrating the side cutter bearing construction.

In the drawing, the bit head 1 is provided with the usual cross cutter supporting legs 2 for supporting the cross cutters 3 and side cutter supporting legs 4 for supporting the side cutters 5. The bit head may be formed in any one of many well known ways, preferably by being initially formed in a plurality of segmental parts, these parts being placed together and integrally joined to each other during the assembly of the bit to provide a unitary bit head as illustrated. It will be understood, however, that the manner of forming the head constitutes no part of this invention and the head may be formed in any desired acceptable manner, which will make it possible to assemble the bearing construction to which this invention relates.

Each of the legs 4 is provided with an integral downwardly and inwardly extending bearing projection 6 which has an outer roller bearing race 7 of a relatively large diameter, an intermediate thrust ball race 8 of substantially the same or slightly larger diameter, and an inner radial roller race 9 of smaller diameter than either of the other races. The projection 6 is undercut at 10 so that the bearing race 9 partly underlies that portion of the projection 6 on which the ball race 8 is formed.

The cutter 5 is likewise provided with an outer roller race 10 opposite the race 7, an intermediate ball race 11 opposite the race 8 and an inner roller race 12 opposite the race 9. Rollers 13 and 14 are provided for the respective roller races and balls 15 for the ball races so that the cutter may be supported against radial loads by the two sets of rollers and against thrust loads by the single set of balls.

For the purpose of inserting the balls 15, the projection 6 is provided with a passageway 16, which is substantially parallel to the axis of this projection and of sufficient size to permit the balls 15 to pass therethrough. The inner end of this passageway is substantially tangent to the inner surface of the ball race on the projection 6 and there is a short passageway 17 from the passageway 16 into the ball race, so that the balls may be inserted therein. As will be seen, the passageway 16 partially intersects the roller race at its uppermost point.

Figure 2:
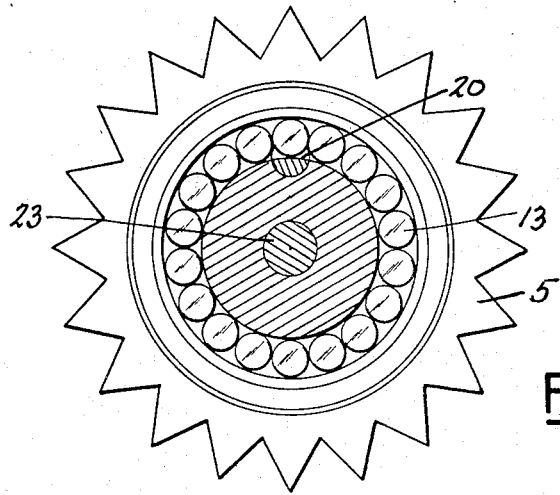
Fig. 2 shows a cross section through the side cutter bearing support taken along the line 2—2 of Fig. 1.

In assembling the bearing just described, the side cutters 5 will be placed on their respective projections 6 and the rollers 14 put in place. The rollers 14 may be put in place either before or after the cutters 5 have been placed on the projections 6. Also, all of the rollers 13 but one may be put in place before the cutter is placed on its projection, or all of these rollers may be left out and put in place after the cutter has been placed on its projection. After the cutter is in place on its projection, the balls 15 will be forced into their race through the passageway 16 until all of the balls have been put in place. Thereupon, a short plug 18 will be placed in the passageway 16 beneath the ball race to prevent the balls from coming out. After this, all of the rollers 13 that have not already been put in place will be inserted through the passageway 16 and when the last roller 13 is in place a relatively long plug 19 will be inserted substantially filling the passageway 16 from the outer extremity of the race 7 to substantially the outer surface of the leg 4. This plug 19 also has a part 20 extending under the uppermost of the rollers 13 and providing a continuation of the race 7 as clearly shown in Fig. 2. The plug 19 may be welded or otherwise secured in place as shown at 21.

When the bit head is assembled, there is placed between the two side cutter bearing projections a bridge 22 having pins 23 on its opposite ends, these pins being adapted to pass through bores 24 provided therefor in the projections 6. These pins may be secured in position by welding or other suitable means as shown at 25.

It will readily be seen that a bearing has been provided for a side cutter of a roller bit, which bearing will serve to transmit all of the stress upon the cutter directly to the bit head through an integral bearing projection, and that a novel and highly advantageous means of assembling such bearing has been provided.

Having described my invention, I claim:

1. In a drill bit of the type comprising a bit head, a downwardly extending cutter supporting leg thereon, an inwardly extending integral cutter shaft on said leg adjacent the lower end thereof, the subcombination comprising a roller race on said cutter shaft adjacent said leg and a ball race thereon more remote from said leg, a one piece cutter surrounding said shaft and having a roller race and a ball race opposed to said first mentioned roller and ball races respectively, said leg and shaft having a passageway therein extending from the outer surface of said shaft and intersecting both said roller race and said ball race on said shaft whereby balls and rollers may be introduced into said ball and roller races respectively when said cutter is in place on said shaft, means within and closing that portion of the passageway communicating with the ball race after said balls are in place in their race, a second means for closing the remainder of said passage communicating with said roller race after the rollers are in place in their race, said second means having a part providing a continuation of said roller race and fitting behind or within the row of rollers when in place within said passageway, so that at no point will the entire end face portion of any one roller bear directly against the entire end face portion of said second means nor against the entire end face portion of said first means.

2. In a drill bit of the type comprising a bit head, a downwardly extending cutter supporting leg thereon, an inwardly extending integral cutter shaft on said leg adjacent the lower end thereof, the subcombination comprising a roller race on said cutter shaft adjacent said leg and a ball race thereon more remote from said leg, a one piece cutter surrounding said shaft and having a roller race and a ball race opposed to said first mentioned roller and ball races respectively, said leg and shaft having a passageway therein extending from the outer surface of said shaft and intersecting both said roller race and said ball race on said shaft whereby balls and rollers may be introduced into said ball and roller races respectively when said cutter is in place on said shaft, a short plug within and closing that portion of the passageway communicating with the ball race after said balls are in place in their race, a relatively long plug for closing the remainder of said passage communicating with said roller race after the rollers are in place in their race, said relatively long plug having a part providing a continuation of said roller race and fitting behind or within the row of rollers when in place within said passageway, so that at no point will the entire end face portion of any one roller bear directly against the entire end face portion of said relatively long plug nor against the entire end face portion of said short plug.

WALTER C. FRANCIS.